UNITED STATES PATENT OFFICE.

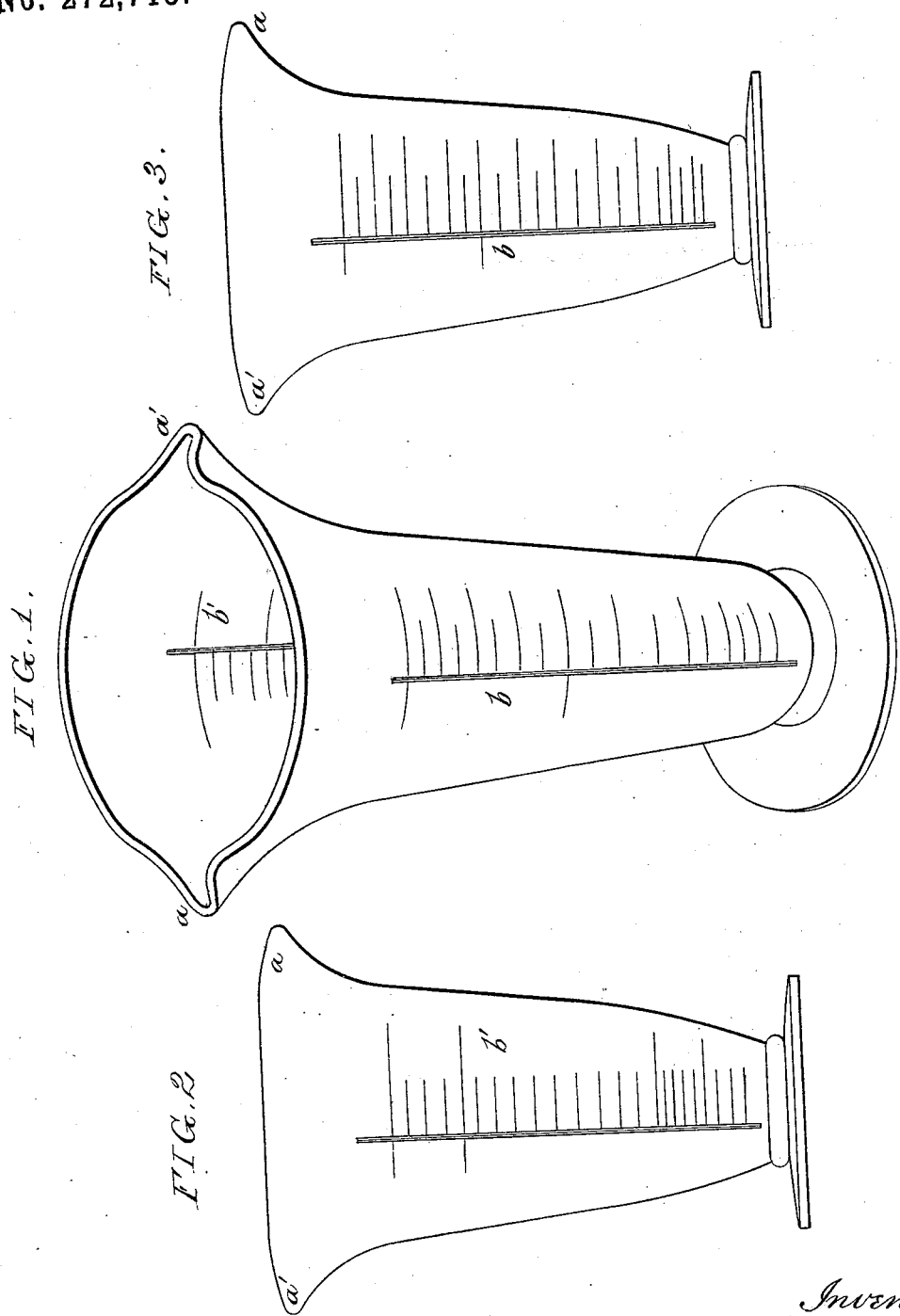

LEWIS C. LEAKE, OF MILLVILLE, N. J., ASSIGNOR TO JAMES WHITALL AND ROBERT P. SMITH, OF PHILADELPHIA, PA., JOHN MICKLE, OF MILLVILLE, N. J., WILLIAM H. NICHOLSON AND CHARLES ROBERTS, OF PHILADELPHIA, PA., AND CHARLES A. TATUM, OF NEW YORK, N. Y.

DRUGGIST'S GRADUATE.

SPECIFICATION forming part of Letters Patent No. 272,713, dated February 20, 1883.

Application filed March 16, 1882. (No model.)

*To all whom it may concern:*

Be it known that I, LEWIS C. LEAKE, a citizen of the United States, and a resident of Millville, Cumberland county, New Jersey, have invented an Improvement in Graduated Measuring-Vessels, of which the following is a specification.

My invention relates to an improvement in that class of measuring-vessels which have two graduated scales, one scale for measuring quantity and the other indicating weight; and the object of my invention is to afford facilities for manipulating measures of this class.

In the accompanying drawings, Figure 1 is a perspective view of my improved measuring-vessel; Fig. 2, a view of one side of the same, and Fig. 3 a view of the opposite side.

As regards general configuration, the measuring-glass is similar to those in common use by chemists and others, with the exception that there are two spouts instead of one. These spouts $a$ $a'$ are directly opposite to each other, as shown in Fig. 1, each being similar to the spout of an ordinary measuring-glass. There are two scales, $b$ $b'$, one on one side and the other on the opposite side of the body of the measure, one scale being graduated to measure the quantity of the liquid contents of the vessel and the other to indicate the weight of the contents, the scales and spouts bearing the relation shown in Fig. 1 to each other.

In manipulating the vessel there will always be a spout in a proper position for pouring out the contents by tilting the measure from right to left, no matter which of the scales is nearest to the manipulator.

I claim as my invention—

A glass measure in which two scales having different graduations, one scale on each side of the measure, are combined with two spouts arranged in respect to each other and to the scales as set forth.

In testimony whereof I have signed my name to this specification in the presence of two subscribing witnesses.

LEWIS C. LEAKE.

Witnesses:
A. R. GASKILL,
W. J. TWEED.